(12) United States Patent
Tripuraneni et al.

(10) Patent No.: US 12,361,363 B2
(45) Date of Patent: Jul. 15, 2025

(54) METHOD AND SYSTEM FOR PROFICIENCY IDENTIFICATION

(71) Applicant: JPMorgan Chase Bank, N.A., New York, NY (US)

(72) Inventors: Subhashini Tripuraneni, Flower Mound, TX (US); Di Yu, Lewisville, TX (US); Shaltiel Eloul, London (GB); Sean Moran, Putney (GB); Lucas Newman, Carrollton, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 196 days.

(21) Appl. No.: 17/449,344

(22) Filed: Sep. 29, 2021

(65) Prior Publication Data

US 2023/0095036 A1 Mar. 30, 2023

(51) Int. Cl.
*G06Q 10/0639* (2023.01)
*G06Q 10/1053* (2023.01)

(52) U.S. Cl.
CPC . *G06Q 10/06398* (2013.01); *G06Q 10/06395* (2013.01); *G06Q 10/1053* (2013.01)

(58) Field of Classification Search
CPC ....... G06Q 10/06398; G06Q 10/06395; G06Q 10/1053
USPC .......................................................... 705/7.42
See application file for complete search history.

(56) References Cited

U.S. PATENT DOCUMENTS

| | | | |
|---|---|---|---|
| 10,901,708 B1 * | 1/2021 | Reas | G06N 20/00 |
| 2005/0005261 A1 * | 1/2005 | Severin | G06F 8/316 |
| | | | 717/116 |
| 2008/0046860 A1 * | 2/2008 | Kratschmer | G06F 11/008 |
| | | | 717/101 |
| 2008/0124686 A1 * | 5/2008 | Forman | G09B 7/02 |
| | | | 434/219 |
| 2014/0149435 A1 * | 5/2014 | Sisman | G06F 11/362 |
| | | | 707/751 |
| 2015/0309813 A1 * | 10/2015 | Patel | G06F 21/577 |
| | | | 703/22 |
| 2018/0144002 A1 * | 5/2018 | Girijavallabhan | G06F 16/2452 |
| 2018/0329695 A1 * | 11/2018 | Liu | G06F 16/3347 |

(Continued)

OTHER PUBLICATIONS

"Determination of competency of programmers by classification and ranking using AHP" to Somasundaram et al, Oct. 8, 2015 (Year: 2015).*

(Continued)

*Primary Examiner* — Rutao Wu
*Assistant Examiner* — Po Han Lee
(74) *Attorney, Agent, or Firm* — GREENBLUM & BERNSTEIN, P.L.C.

(57) ABSTRACT

A method for automatically identifying proficiencies based on an associated set of codes is provided. The method includes retrieving a file that is associated with a user from a repository, the repository including a source code repository; classifying the file based on a corresponding programming language; determining, by using a model, a proficiency attribute of the user based on the file and a result of the classification; identifying a characteristic of the user based on corresponding activity data from the repository; and generating a profile that corresponds to the user based on the proficiency attribute and the characteristic, the profile including a plurality of proficiency attributes that correspond to the user.

20 Claims, 8 Drawing Sheets

(56) References Cited

U.S. PATENT DOCUMENTS

| | | | | |
|---|---|---|---|---|
| 2020/0394588 A1* | 12/2020 | Sanchez | .................... | G06F 8/75 |
| 2021/0208855 A1* | 7/2021 | Zhang | ...................... | G06F 8/36 |
| 2021/0374649 A1* | 12/2021 | Haldar | ........... | G06Q 10/063112 |
| 2022/0107799 A1* | 4/2022 | Wu | ........................... | G06F 8/70 |
| 2022/0114532 A1* | 4/2022 | Virnoche | ........... | G06Q 10/1053 |

OTHER PUBLICATIONS

Non-Patent Literature, "Profiling Software Developers with Process Mining and N-Gram Language Models" to Caldeira et al, Jan. 19, 2021 (Year: 2021).*

* cited by examiner

| Category ~Subcategory | Skills View | Skill | Code | Date | Skill Details |
|---|---|---|---|---|---|
| Solution Development and Implementation ~Systems Development | Software Engineering DevOps | Programming/ Software Development | PROG | T0 | Front End Developer – React, D3, JavaScript, HTML, CSS; maintain |
| | | | | T1 | DevOps Engineer – Jenkins, Python; value add |

METHOD AND SYSTEM FOR PROFICIENCY IDENTIFICATION

BACKGROUND

1. Field of the Disclosure

This technology generally relates to methods and systems for identifying proficiencies, and more particularly to methods and systems for automatically identifying developer proficiencies from associated software codes by using machine learning models to analyze code dependencies, code structures, and code documentations.

2. Background Information

Many business entities provide services to customers by using a variety of software programs. Large teams of developers such as, for example, software engineers are often required to facilitate the development and maintenance of these software programs. Historically, implementation of conventional techniques for identifying developer proficiencies and for tracking proficiency advancements over time has resulted in varying degrees of success with respect to talent retention and personalized training requirements.

One drawback of using the conventional techniques is that in many instances, developer proficiencies are self-reported and only assessed during initial hiring. As such, since developer proficiencies evolve over time, the business entities do not have a complete record of current developer proficiencies. Due to the lack of current developer proficiency data, business entities are not able to develop effective talent retention strategies and personalized training requirements.

Therefore, there is a need to automatically identify developer proficiencies from associated software codes by using machine learning models to analyze code dependencies, code structures, and code documentations.

SUMMARY

The present disclosure, through one or more of its various aspects, embodiments, and/or specific features or sub-components, provides, inter alia, various systems, servers, devices, methods, media, programs, and platforms for automatically identifying developer proficiencies from associated software codes by using machine learning models to analyze code dependencies, code structures, and code documentations.

According to an aspect of the present disclosure, a method for automatically identifying proficiencies based on an associated set of codes is provided. The method is implemented by at least one processor. The method may include retrieving at least one file that is associated with a user from at least one repository, the at least one repository may include a source code repository; classifying each of the at least one file based on a corresponding programming language; determining, by using at least one model, at least one proficiency attribute of the user based on the at least one file and a result of the classification; identifying at least one characteristic of the user based on corresponding activity data from the at least one repository; and generating a profile that corresponds to the user based on the at least one proficiency attribute and the at least one characteristic, the profile may include a plurality of proficiency attributes that corresponds to the user.

In accordance with an exemplary embodiment, the method may further include determining at least one retention strategy based on the profile and at least one predetermined guideline; identifying, by using the profile, at least one employment requisition; generating at least one graphical element, the at least one graphical element may include information that relates to at least one from among the determined at least one retention strategy and the identified at least one employment requisition; and displaying, via a graphical user interface, the generated at least one graphical element.

In accordance with an exemplary embodiment, the method may further include determining at least one personalized training strategy for the user based on the profile; identifying at least one training resource based on the determined at least one personalized training strategy; generating at least one graphical element, the at least one graphical element may include information that relates to at least one from among the determined at least one personalized training strategy and the identified at least one training resource; and displaying, via a graphical user interface, the generated at least one graphical element.

In accordance with an exemplary embodiment, for determining the at least one proficiency attribute, the method may further include extracting code data from the at least one file, the code data may include at least one from among code dependency data, code documentation data, and code structure data; assigning at least one feature to the code data, the at least one feature may define at least one from among an identified code dependency and an identified code functionality; generating at least one structured data set based on the code data and the assigned at least one feature; and automatically determining, by using the at least one model, the at least one proficiency attribute based on the at least one structured data set.

In accordance with an exemplary embodiment, for identifying the at least one characteristic, the method may further include retrieving the corresponding activity data for each of the at least one file from the at least one repository; parsing the corresponding activity data to remove excess data; determining at least one metric by using the parsed corresponding activity data, the at least one metric may include at least one from among a code volume metric, a code complexity metric, and a code interaction metric; and identifying the at least one characteristic by using the at least one metric.

In accordance with an exemplary embodiment, the corresponding activity data may include information that relates to at least one from among commit information and review information, the information may correspond to at least one master branch for a predetermined period of time.

In accordance with an exemplary embodiment, the excess data may include at least one from among an integrated development environment generated code, a duplicate code, and a configuration code.

In accordance with an exemplary embodiment, the at least one file may include at least one code snippet, the at least one code snippet may relate to a small region of reusable code that corresponds to at least one from among a source code, a machine learning code, and a textual code.

In accordance with an exemplary embodiment, the at least one proficiency attribute may include at least one skill group, the at least one skill group may include at least one from among a front-end developer skill group, a back-end developer skill group, a development and operations engineer skill group, and a data scientist skill group.

In accordance with an exemplary embodiment, the at least one model may include at least one from among a machine learning model, a statistical model, a mathematical model, a process model, and a data model.

According to an aspect of the present disclosure, a computing device configured to implement an execution of a method for automatically identifying proficiencies based on an associated set of codes is disclosed. The computing device comprising a processor; a memory; and a communication interface coupled to each of the processor and the memory, wherein the processor may be configured to retrieve at least one file that is associated with a user from at least one repository, the at least one repository may include a source code repository; classify each of the at least one file based on a corresponding programming language; determine, by using at least one model, at least one proficiency attribute of the user based on the at least one file and a result of the classification; identify at least one characteristic of the user based on corresponding activity data from the at least one repository; and generate a profile that corresponds to the user based on the at least one proficiency attribute and the at least one characteristic, the profile may include a plurality of proficiency attributes that corresponds to the user.

In accordance with an exemplary embodiment, the processor may be further configured to determine at least one retention strategy based on the profile and at least one predetermined guideline; identify, by using the profile, at least one employment requisition; generate at least one graphical element, the at least one graphical element may include information that relates to at least one from among the determined at least one retention strategy and the identified at least one employment requisition; and display, via a graphical user interface, the generated at least one graphical element.

In accordance with an exemplary embodiment, the processor may be further configured to determine at least one personalized training strategy for the user based on the profile; identify at least one training resource based on the determined at least one personalized training strategy; generate at least one graphical element, the at least one graphical element may include information that relates to at least one from among the determined at least one personalized training strategy and the identified at least one training resource; and display, via a graphical user interface, the generated at least one graphical element.

In accordance with an exemplary embodiment, for determining the at least one proficiency attribute, the processor is further configured to extract code data from the at least one file, the code data may include at least one from among code dependency data, code documentation data, and code structure data; assign at least one feature to the code data, the at least one feature may define at least one from among an identified code dependency and an identified code functionality; generate at least one structured data set based on the code data and the assigned at least one feature; and automatically determine, by using the at least one model, the at least one proficiency attribute based on the at least one structured data set.

In accordance with an exemplary embodiment, for identifying the at least one characteristic, the processor is further configured to retrieve the corresponding activity data for each of the at least one file from the at least one repository; parse the corresponding activity data to remove excess data; determine at least one metric by using the parsed corresponding activity data, the at least one metric may include at least one from among a code volume metric, a code complexity metric, and a code interaction metric; and identify the at least one characteristic by using the at least one metric.

In accordance with an exemplary embodiment, the corresponding activity data may include information that relates to at least one from among commit information and review information, the information may correspond to at least one master branch for a predetermined period of time.

In accordance with an exemplary embodiment, the excess data may include at least one from among an integrated development environment generated code, a duplicate code, and a configuration code.

In accordance with an exemplary embodiment, the at least one file may include at least one code snippet, the at least one code snippet may relate to a small region of reusable code that corresponds to at least one from among a source code, a machine learning code, and a textual code.

In accordance with an exemplary embodiment, the at least one proficiency attribute may include at least one skill group, the at least one skill group may include at least one from among a front-end developer skill group, a back-end developer skill group, a development and operations engineer skill group, and a data scientist skill group.

In accordance with an exemplary embodiment, the at least one model may include at least one from among a machine learning model, a statistical model, a mathematical model, a process model, and a data model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is a screen shot that illustrates a graphical user interface of a profile that is usable for implementing a method for automatically identifying developer proficiencies from associated software codes by using machine learning models to analyze code dependencies, code structures, and code documentations, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
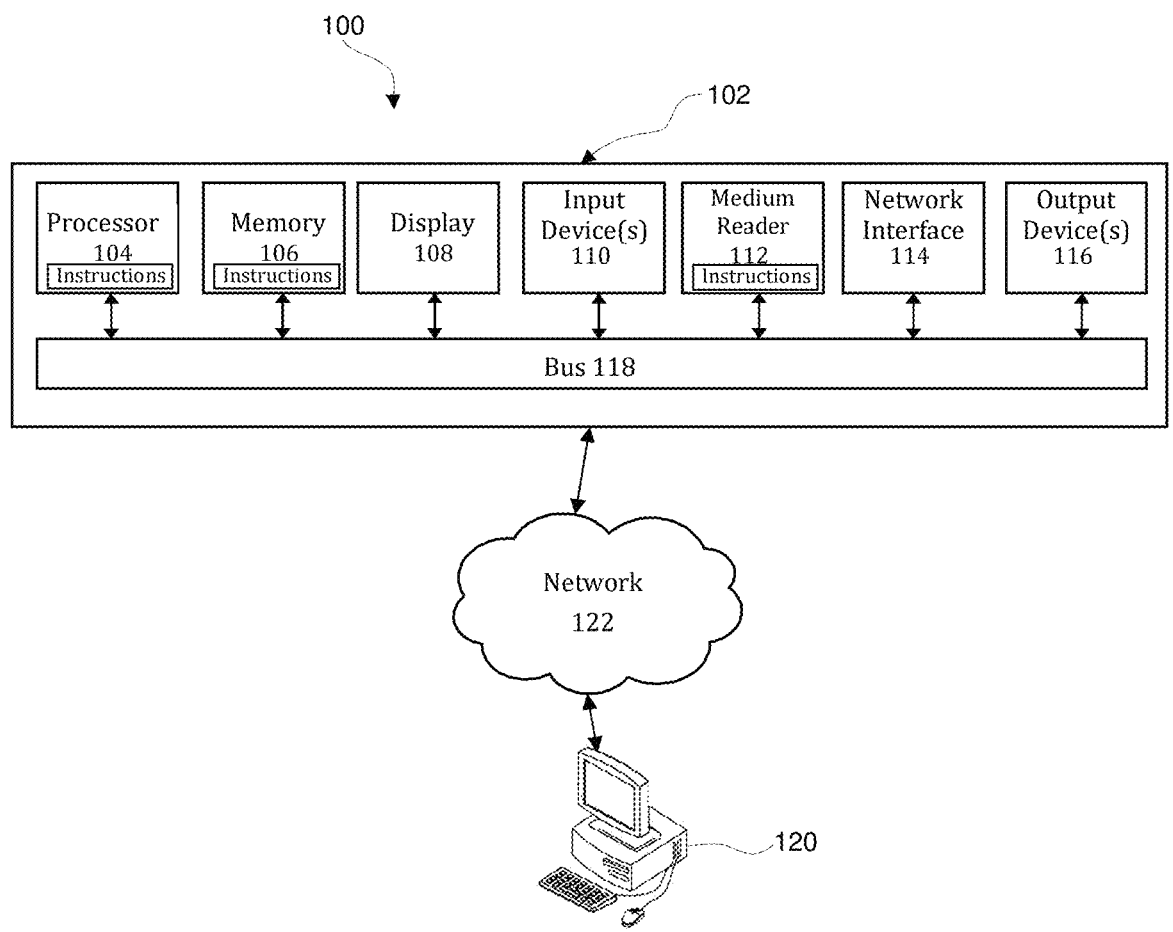
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically identifying developer proficiencies from associated software codes by using machine learning models to analyze code dependencies, code structures, and code documentations.

Figure 2:
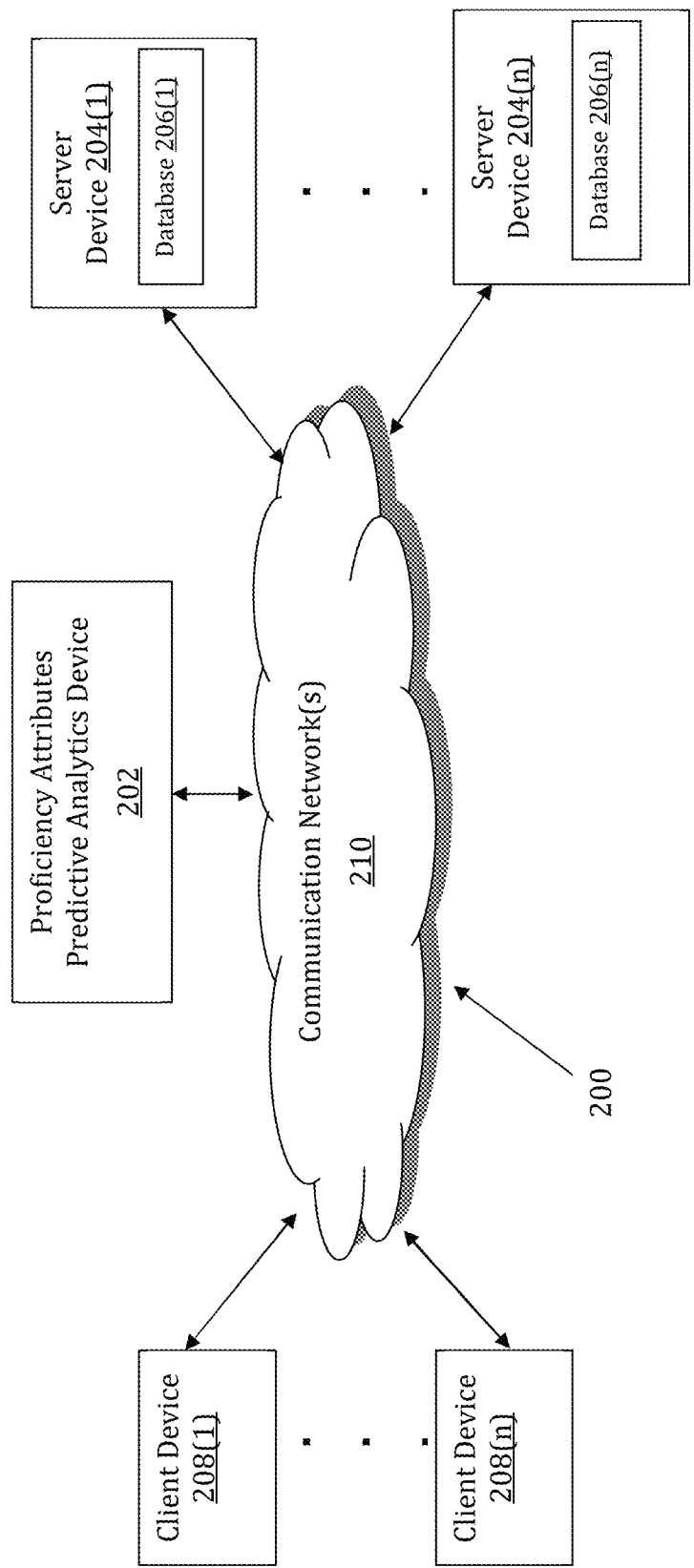
FIG. 2 illustrates an exemplary diagram of a network environment.

Referring to FIG. 2, a schematic of an exemplary network environment 200 for implementing a method for automatically identifying developer proficiencies from associated software codes by using machine learning models to analyze code dependencies, code structures, and code documentations is illustrated. In an exemplary embodiment, the method is executable on any networked computer platform, such as, for example, a personal computer (PC).

The method for automatically identifying developer proficiencies from associated software codes by using machine learning models to analyze code dependencies, code structures, and code documentations may be implemented by a Proficiency Attributes Predictive Analytics (PAPA) device 202. The PAPA device 202 may be the same or similar to the computer system 102 as described with respect to FIG. 1. The PAPA device 202 may store one or more applications that can include executable instructions that, when executed by the PAPA device 202, cause the PAPA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PAPA device 202 itself, may be located in virtual server(s) running in a cloud-based computing environment rather than being tied to one or more specific physical network computing devices. Also, the application(s) may be running in one or more virtual machines (VMs) executing on the PAPA device 202. Additionally, in one or more embodiments of this technology, virtual machine(s) running on the PAPA device 202 may be managed or supervised by a hypervisor.

In the network environment 200 of FIG. 2, the PAPA device 202 is coupled to a plurality of server devices 204(1)-204(n) that hosts a plurality of databases 206(1)-206(n), and also to a plurality of client devices 208(1)-208(n) via communication network(s) 210. A communication interface of the PAPA device 202, such as the network interface 114 of the computer system 102 of FIG. 1, operatively couples and communicates between the PAPA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PAPA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PAPA devices that efficiently implement a method for automatically identifying developer proficiencies from associated software codes by using machine learning models to analyze code dependencies, code structures, and code documentations.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PAPA device 202 may be a standalone device or integrated with one or more other devices or apparatuses, such as one or more of the server devices 204(1)-204(n), for example. In one particular example, the PAPA device 202 may include or be hosted by one of the server devices 204(1)-204(n), and other arrangements are also possible. Moreover, one or more of the devices of the PAPA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PAPA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to software files, source code repositories, programming languages, machine learning models, proficiency attributes, classifications, characteristics, and user profiles.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PAPA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PAPA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PAPA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PAPA device 202, the server devices 204(1)-204(n), or the client devices 208(1)-208(n), for example, may be configured to operate as virtual instances on the same physical machine. In other words, one or more of the PAPA device 202, the server devices 204(1)-204(n), or the client devices 208(1)-208(n) may operate on the same physical device rather than as separate devices communicating through communication network(s) 210. Additionally, there may be more or fewer PAPA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
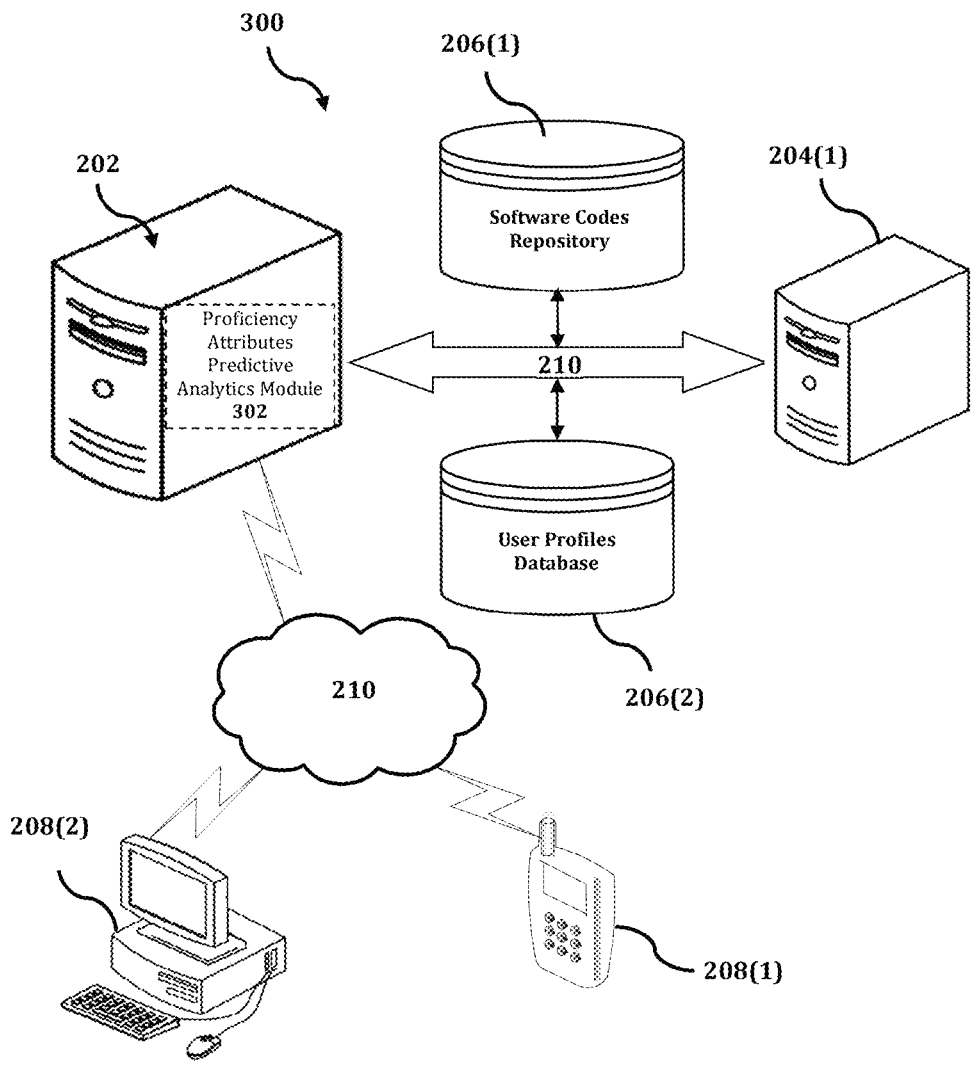
FIG. 3 shows an exemplary system for implementing a method for automatically identifying developer proficiencies from associated software codes by using machine learning models to analyze code dependencies, code structures, and code documentations.

The PAPA device 202 is described and shown in FIG. 3 as including a proficiency attributes predictive analytics module 302, although it may include other rules, policies, modules, databases, or applications, for example. As will be described below, the proficiency attributes predictive analytics module 302 is configured to implement a method for automatically identifying developer proficiencies from associated software codes by using machine learning models to analyze code dependencies, code structures, and code documentations.

An exemplary process 300 for implementing a mechanism for automatically identifying developer proficiencies from associated software codes by using machine learning models to analyze code dependencies, code structures, and code documentations by utilizing the network environment of FIG. 2 is shown as being executed in FIG. 3. Specifically, a first client device 208(1) and a second client device 208(2) are illustrated as being in communication with PAPA device 202. In this regard, the first client device 208(1) and the second client device 208(2) may be "clients" of the PAPA device 202 and are described herein as such. Nevertheless, it is to be known and understood that the first client device 208(1) and/or the second client device 208(2) need not necessarily be "clients" of the PAPA device 202, or any entity described in association therewith herein. Any additional or alternative relationship may exist between either or both of the first client device 208(1) and the second client device 208(2) and the PAPA device 202, or no relationship may exist.

Further, PAPA device 202 is illustrated as being able to access a software codes repository 206(1) and a user profiles database 206(2). The proficiency attributes predictive analytics module 302 may be configured to access these databases for implementing a method for automatically identifying developer proficiencies from associated software codes by using machine learning models to analyze code dependencies, code structures, and code documentations.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PAPA device 202 via broadband or cellular communication. Of course, these embodiments are merely exemplary and are not limiting or exhaustive.

Upon being started, the proficiency attributes predictive analytics module 302 executes a process for automatically identifying developer proficiencies from associated software codes by using machine learning models to analyze code dependencies, code structures, and code documentations. An exemplary process for automatically identifying developer proficiencies from associated software codes by using machine learning models to analyze code dependencies, code structures, and code documentations is generally indicated at flowchart 400 in FIG. 4.

Figure 4:
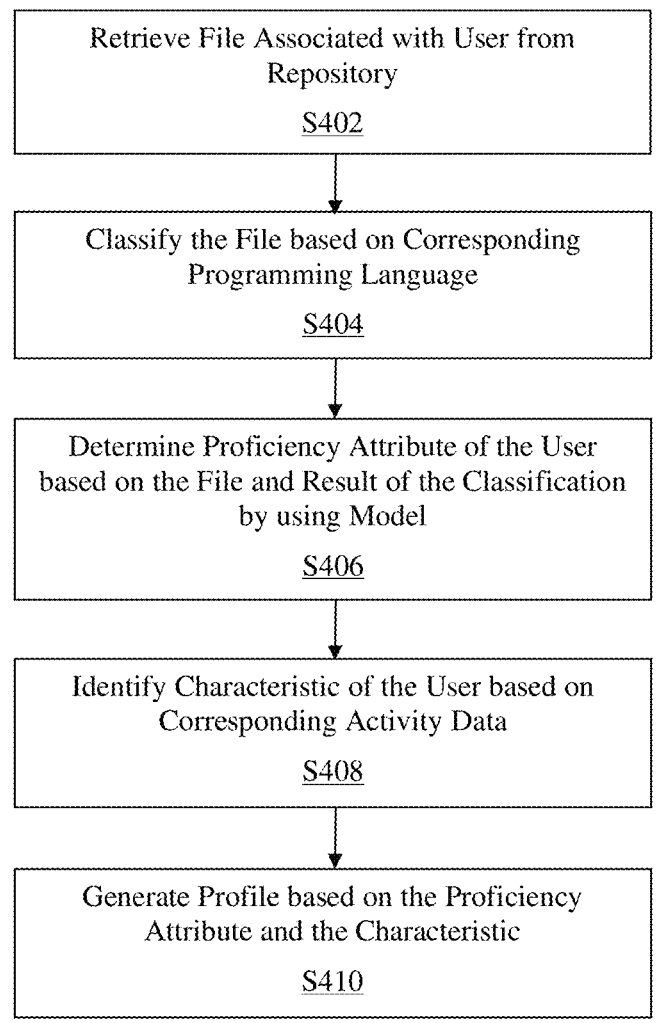
FIG. 4 is a flowchart of an exemplary process for implementing a method for automatically identifying developer proficiencies from associated software codes by using machine learning models to analyze code dependencies, code structures, and code documentations.

In the process 400 of FIG. 4, at step S402, a file that is associated with a user such as, for example, a software engineer may be retrieved from a repository. In an exemplary embodiment, the file may include a collection of data such as, for example, source code data that is stored in a memory under a single identifying name. The file may relate to a project folder that is associated with the user. For example, the file may relate to a software development project folder that includes source code data, which was developed by the user.

In another exemplary embodiment, the repository may relate to at least one from among a data library, data archive, and data repository that persists a collection of data sets such as, for example, the software development project folder. The repository may include a central location in which data is stored and managed. For example, the repository may include a source code repository that contains program codes for software applications. In another exemplary embodiment, the repository may include a distributed data storage structure that facilitates software development by hosting source codes and managing version controls.

In another exemplary embodiment, the file may include a code snippet. The code snippet may relate to a small region of reusable code that corresponds to at least one from among a source code, a machine learning code, and a textual code. The machine learning code may include source code that is related to machine learning such as, for example, a PYTORCH PYTHON script that trains a neural network. The textual code may include source code that is related to text processing such as, for example, a PYTHON script that is usable to tokenize a textual document. In another exemplary embodiment, utilization of the code snippet may enable analysis of uncompleted repositories. For example, by utilizing a code snippet, prototype repositories may be analyzed consistent with disclosures in the present application.

At step S404, the file may be classified based on a corresponding programming language. In an exemplary embodiment, the file may be parsed to facilitate the identification of the programming language. Elements such as, for example, a set of declarations within the parsed file may be compared to known programming languages to facilitate identification of the programming language. Language analysis techniques such as, for example, natural language processing techniques may be used to analyze the file and identify the elements. In another exemplary embodiment, the file may be parsed into smaller components to facilitate the identification of the programming language. For example, the file may be parsed into code snippets prior to classification to reduce resource requirements relating to the classification process.

At step S406, a proficiency attribute of the user may be determined based on the file and a result of the classification. In an exemplary embodiment, the proficiency attribute may include a skill group that corresponds to the user. The skill group may relate to a grouping of a plurality of users based on a shared trait such as, for example, coding skill of a software engineer. The skill group may include at least one from among a front-end developer skill group, a back-end developer skill group, a development and operations engineer skill group, and a data scientist skill group.

In another exemplary embodiment, the proficiency attribute of the user may be determined based on content of the file. The content of the file may include code elements such as, for example, code dependencies, code comments and/or documentation, as well as code structure. In another exemplary embodiment, the code dependencies may include at least one from among an external code dependency and an internal code dependency. The external code dependency may relate to an external library that is relied upon by the source code. The internal code dependency may relate to an internal library that is relied upon by the source code. The compile time and runtime dependencies may be retrieved from build tools and source codes.

In another exemplary embodiment, the code comments and/or documentation may include keywords that are used by the user to describe the code. The keywords may be analyzed based on analysis techniques such as, for example, distribution analysis techniques and clustering analysis techniques to determine the proficiency attribute. For example, analysis of frequently occurring keywords in a source code file that is associated with the user may indicate a likelihood that the user is proficient in a particular programming language.

In another exemplary embodiment, the code structure may include structural elements from source code that are extracted from the file. The structural elements may be analyzed based on analysis techniques such as, for example, an abstract syntax tree (AST) technique that represents the abstract syntactic structure of the source code. Each node of the AST may denote a construct occurring in the source code. For example, analysis of the structural elements may result in frequently occurring structural elements that are usable to represent a trait of the file, which is usable to represent a proficiency attribute of the user.

In another exemplary embodiment, the proficiency attribute may be determined by using a model. The model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the proficiency attribute may be determined by extracting code data from the file. Consistent with disclosures in the present application, the code data may include at least one from among code dependency data, code documentation data, and code structure data. A feature may then be assigned to the code data. The feature may define at least one from among an identified code dependency and an identified code functionality. Subsequently, a structured data set may be generated based on the code data and the assigned feature. By using the model, the proficiency attribute may be automatically determined based on the structured data set.

At step S408, a characteristic of the user may be identified based on corresponding activity data from the repository. In an exemplary embodiment, the corresponding activity data may include information that relates to at least one from among commit information and review information. The information may, in turn, correspond to at least one master branch for a predetermined period of time.

In another exemplary embodiment, the characteristic of the user may relate to at least one from among a code generation characteristic, a volume characteristic, a complexity characteristic, and an interaction characteristic. The code generation characteristic may relate to whether the file was maintained and whether new code for the file was written. The volume characteristic may relate to a volume of code in the file such as, for example, a number of lines of source code in the file. The complexity characteristic may relate to a predetermined complexity measure of the programming language that is classified with the file. For example, programming language A may have a higher complexity measure than programming language B because programming language A was determined to be more complex than programming language B. The interaction characteristic may relate to an interaction between the user and a plurality of users. For example, the interaction characteristic may indicate collaboration between the user and a plurality of users based on shared source codes and dependencies.

In another exemplary embodiment, the characteristic of the user may be identified by retrieving the corresponding activity data for the file from the repository. The corresponding activity data may be parsed to remove excess data. The excess data may include at least one from among an integrated development environment generated code, a duplicate code, and a configuration code. Then, a metric may be determined by using the parsed corresponding activity data. Consistent with disclosures in the present application, the metric may include at least one from among a code volume metric, a code complexity metric, and a code interaction metric. By using the determined matric, a characteristic of the file may be identified.

At step S410, a profile that corresponds to the user may be generated based on the determined proficiency attribute and the identified characteristic. The profile may include a plurality of proficiency attributes and a plurality of characteristics that correspond to the user. In an exemplary embodiment, the profile may correspond to a graphical element that is generated to display the determined proficiency attribute and the identified characteristic via a graphical user interface. The graphical element may include a tabular presentation of the determined proficiency attribute and the identified characteristic. In another exemplary embodiment, the profile may be associated with the user in a database such as, for example, a human resources database.

In another exemplary embodiment, a retention strategy may be determined based on the profile and a predetermined guideline. The predetermined guideline may relate to a business guideline such as, for example, a human resource guideline for developing employee talent. An employment requisition may also be identified by using the profile. The employment requisition may relate to an internal job posting and corresponding qualification information.

Then, a graphical element may be generated and displayed via a graphical user interface. The graphical element may include information the relates to at least one from among the determined retention strategy and the identified employment requisition. For example, based on the profile, an internal job posting with requirements that matches the proficiency attributes of the user may be identified and displayed for the user via the graphical user interface to enhance internal employee mobility. In another example, based on the profile, a personalized retention strategy for the user may be determined and displayed for an administrator such as a human resource representative via the graphical user interface. The personalized retention strategy may include incentives such as, for example, rewards for an employee who has accumulated a broad array of skills.

In another exemplary embodiment, a personalized training strategy may be determined for the user based on the profile. A training resource may also be identified based on the determined personalized training strategy. Then, a training graphical element may be generated and displayed via a graphical user interface. The training graphical element may include information that relates to at least one from among the determined personalized training strategy and the identified training resource. For example, based on the profile, a personalized training strategy such as a personalized learning journey may be determined for the user to cultivate a beneficial and desired proficiency attribute.

FIG. 5 is a screen shot 500 that illustrates a graphical user interface of a profile that is usable for implementing a method for automatically identifying developer proficiencies from associated software codes by using machine learning models to analyze code dependencies, code structures, and code documentations, according to an exemplary embodiment. In FIG. 5, the profile may include a plurality of proficiency attributes and a plurality of characteristics that correspond to the user. The profile may correspond to a graphical element that is generated to display the determined proficiency attribute and the identified characteristic via a graphical user interface.

As illustrated in FIG. 5, the profile may organize user characteristics and proficiency attributes into groups such as, for example, a category, a subcategory, a skills view, a skill, a code, a date, and a skill detail. The category may include information that relates to solution development and implementation, which includes a subcategory of systems development. The skills view may include information that relates to software engineering as well as development and operations (DevOps). The skill may include information that relates to programming and/or software development. The code may include information that relates to a predetermined classification code. The date may include information that relates to a time period. The profile may include the user characteristics and the proficiency attributes of the user for a plurality of time periods. The skill detail may include information that relates to a front-end developer who is adequately skilled in programming languages such as, for example, hypertext markup language (HTML).

Figure 6:
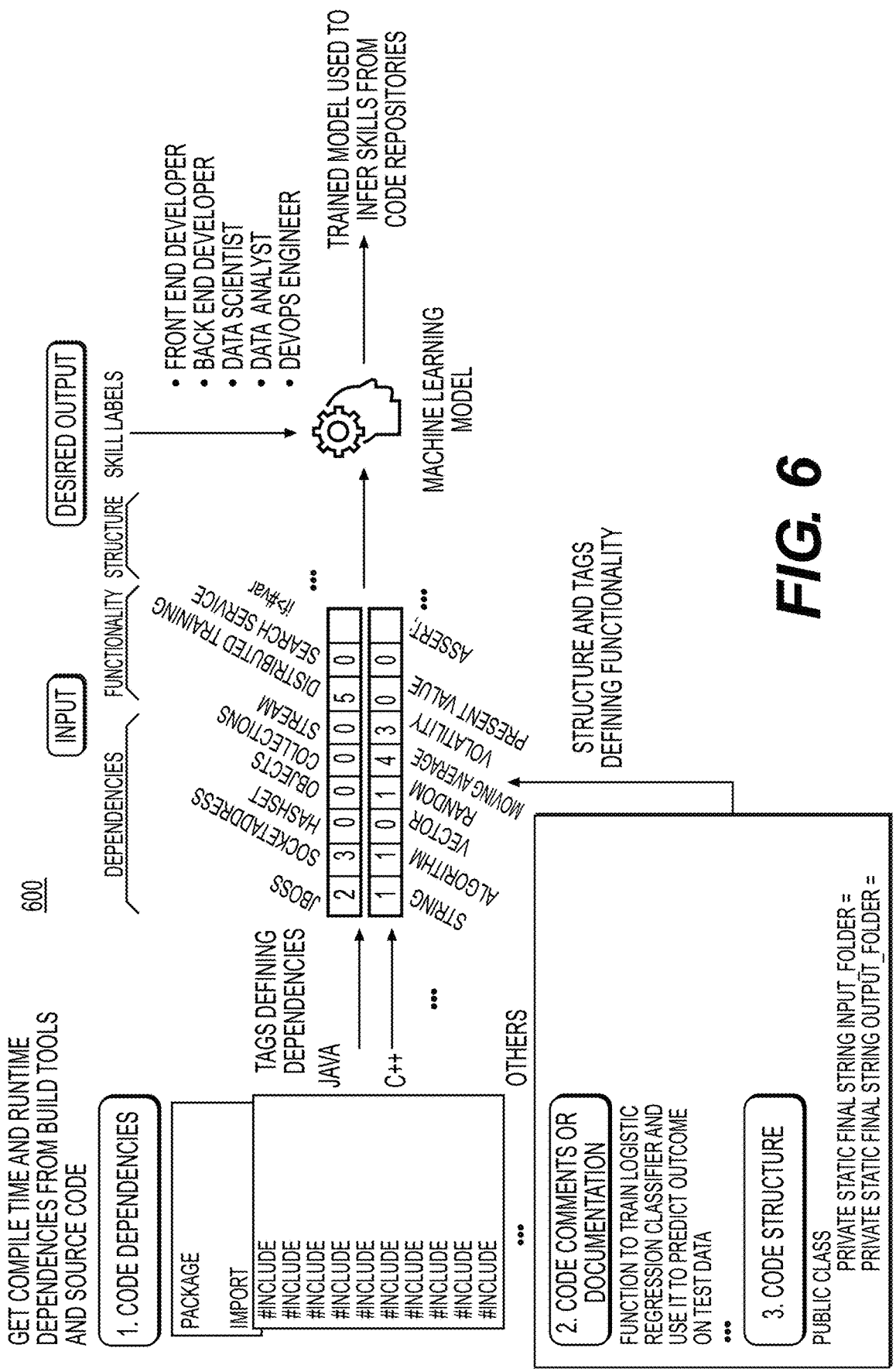
FIG. 6 is a flow diagram of an exemplary code vectoring process for implementing a method for automatically identifying developer proficiencies from associated software codes by using machine learning models to analyze code dependencies, code structures, and code documentations.

FIG. 6 is a flow diagram 600 of an exemplary code vectoring process for implementing a method for automatically identifying developer proficiencies from associated software codes by using machine learning models to analyze code dependencies, code structures, and code documentations. In FIG. 6, the proficiency attributes of the user may be extracted from associated work product consistent with disclosures in the present application.

As illustrated in FIG. 6, compile runtime and runtime dependencies may be retrieved from build tools and source codes. Code dependencies, code comments and/or documentation, and code structure may be used to determine the proficiency attributes. The code dependencies may include features that define dependencies of the code. The code comments and/or documentation as well as the code structure may include features that define code functionality. Then, the code dependencies, code comments and/or documentations, and code structures may be used to generate a vector that is usable by a machine learning model to determine skill labels. The skill labels may include a front-end developer skill label, a back-end developer skill label, a data scientist skill label, a data analyst skill label, and a DevOps Engineer skill label. Additionally, the generated vector may be used to train and refine the machine learning model.

Figure 7:
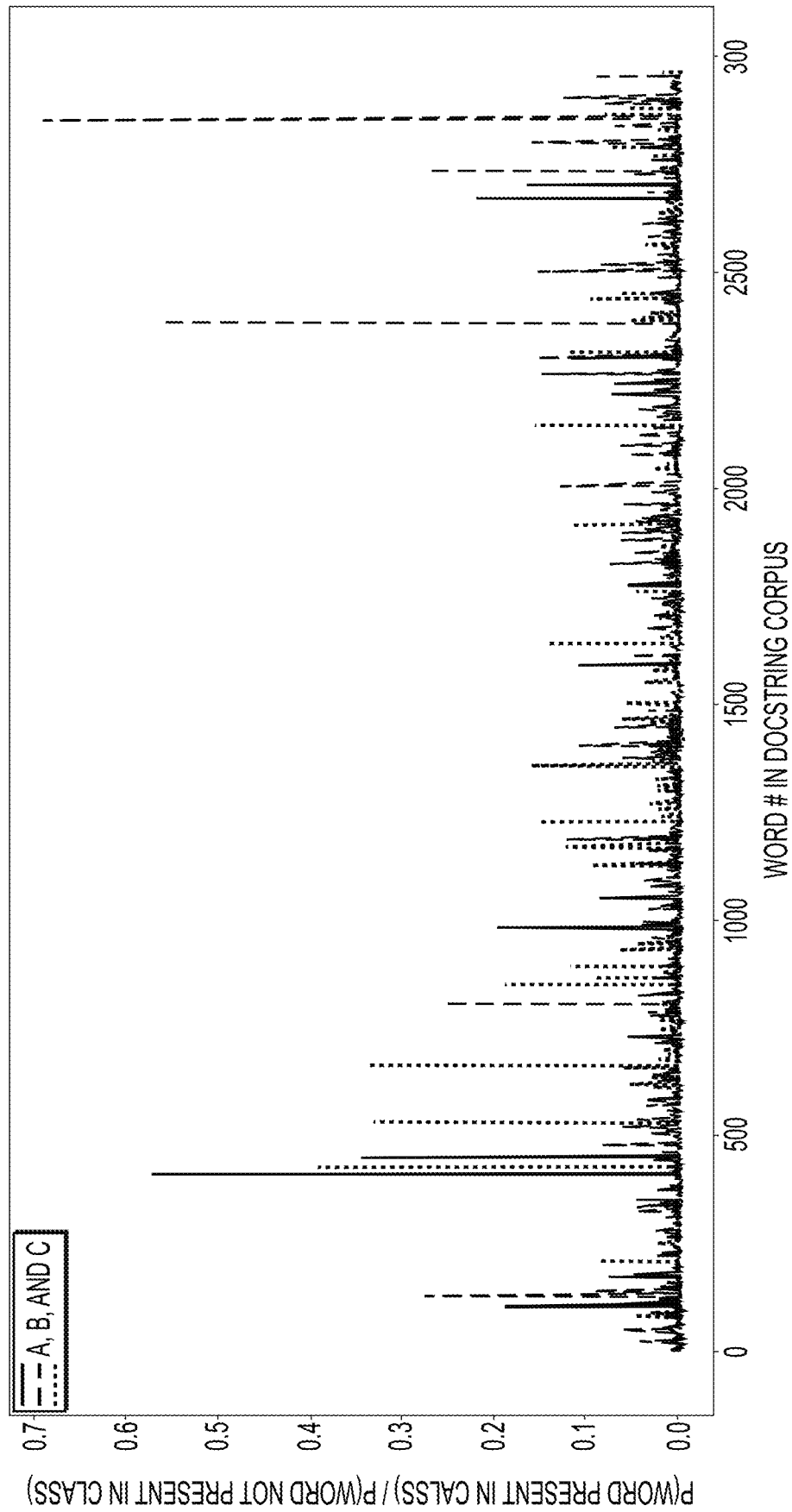
FIG. 7 is a screen shot that illustrates a graphical user interface of keyword distributions that is usable for implementing a method for automatically identifying developer proficiencies from associated software codes by using machine learning models to analyze code dependencies, code structures, and code documentations, according to an exemplary embodiment.

FIG. 7 is a screen shot 700 that illustrates a graphical user interface of keyword distributions that is usable for implementing a method for automatically identifying developer proficiencies from associated software codes by using machine learning models to analyze code dependencies, code structures, and code documentations, according to an exemplary embodiment. In FIG. 7, a keyword distribution from source code documentation may be graphically displayed based on skills. As illustrated in FIG. 7, the X-axis may represent the identified keywords, and the Y-axis may represent a probability of a certain word defining the skills. Color coding each of the skills may enable the graphical representation to display information for a plurality of different skills such as, for example, skills A, B, and C.

Figure 8:
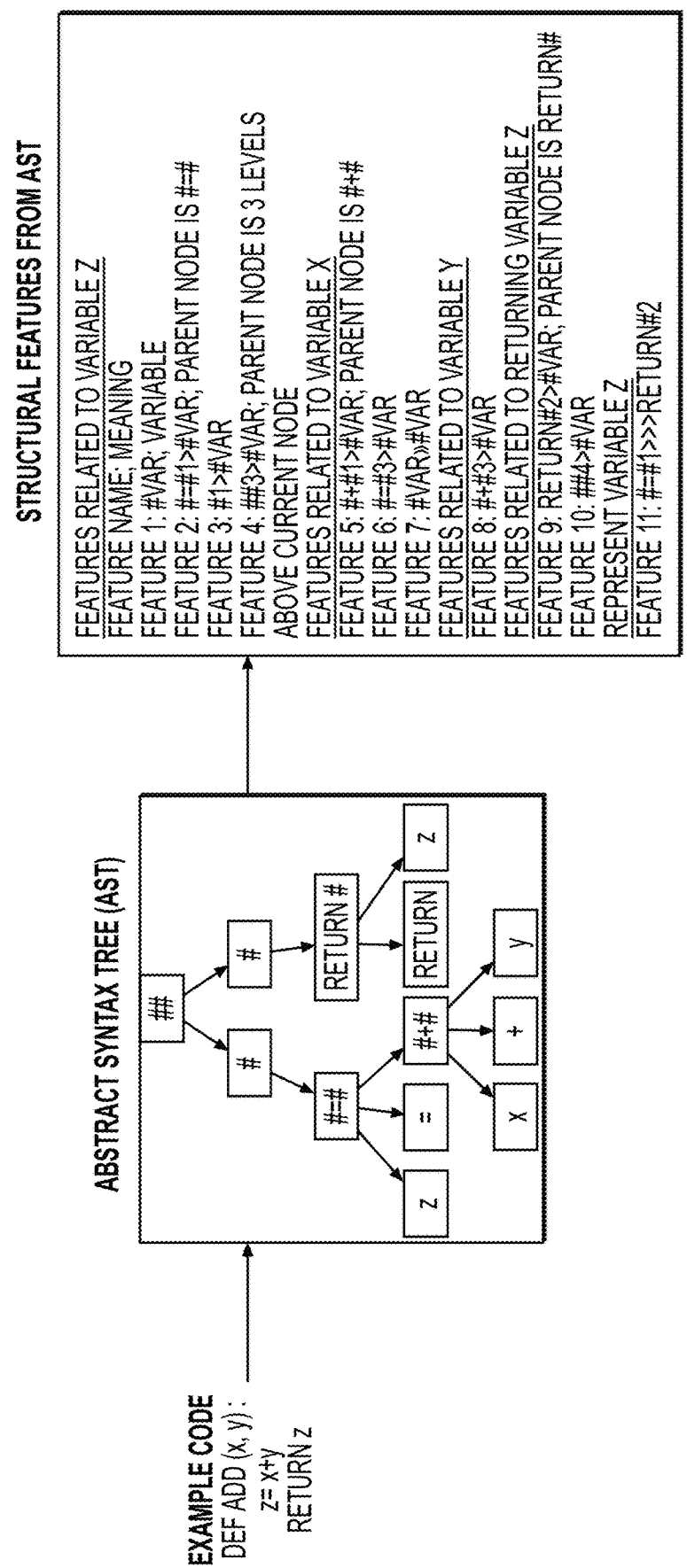
FIG. 8 is a flow diagram of an exemplary structural element extraction process for implementing a method for automatically identifying developer proficiencies from associated software codes by using machine learning models to analyze code dependencies, code structures, and code documentations.

FIG. 8 is a flow diagram 800 of an exemplary structural element extraction process for implementing a method for automatically identifying developer proficiencies from associated software codes by using machine learning models to analyze code dependencies, code structures, and code documentations. In FIG. 8, structural elements from source codes are extracted based on the file and the most frequently occurring structural elements across all files are used to represent each source code file. Each source code file may be represented by structural elements as well as by code documentation and code dependencies consistent with disclosures in the present application.

As illustrated in FIG. 8, an abstract syntax tree (AST) may be generated for a source code. Structural features may be extracted for the source code based on the AST. For example, structural features may be extracted for variables Z, X, and Y as well as for return variable Z. The structural features may be correlated with a particular programming language and proficiency attribute consistent with disclosures in the present application.

Accordingly, with this technology, an optimized process for automatically identifying developer proficiencies from associated software codes by using machine learning models to analyze code dependencies, code structures, and code documentations is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically identifying proficiencies based on an associated set of codes, the method being implemented by at least one processor, the method comprising:
retrieving, by the at least one processor, at least one file that is associated with a user from at least one repository, the at least one repository including a source code repository that is incomplete, and the at least one file includes at least one code snippet of a source code that is less than the source code;
vectorizing, via build tools executed by the at least one processor, content of the at least one file for generating a plurality of vectors that is inputted into at least one model, the at least one model including a machine learning model,
wherein the content of the at least one file includes one or more code dependencies based on at least socket addresses, keywords, structural elements, an external code dependency, an internal code dependency, compile time dependency and runtime dependency, and
wherein the generating of the plurality of vectors includes combining the one or more of the code dependencies, the keywords, the structural elements, the external code dependency, the internal code dependency, the compile time dependency and the runtime dependency for generating the plurality of vectors;
generating, by the at least one processor, an abstract syntax tree based on the at least one file, wherein the generating of the abstract syntax tree includes identifying the structural elements within the at least one file via natural language processing and parsing the structural elements for classification;
analyzing the structural elements based on the generated abstract syntax tree, wherein the abstract syntax tree represents an abstract syntactic structure of the source code, and wherein each node of the abstract syntax tree denotes a construct occurring in the source code;
identifying, based on the analyzing using the generated abstract syntax tree, frequency of occurrence of each of the structural elements;
training the machine learning model using the plurality of vectors, the abstract syntax tree, and the frequency of occurrence of each of the structural elements with respect to a plurality of skill labels for a plurality of skills;
determining, via the machine learning model, a level of proficiency corresponding to each of the plurality of skill labels based on the vectorized content of the at least one file and the frequency of occurrence of each of the structural elements;
generating, by the at least one processor, a plurality of graphical elements that indicates the level of proficiency corresponding to each of the plurality of skill labels for the user;
displaying, by the at least one processor and on a graphical user interface, a graphical representation of a distribution of the keywords included in the at least one file based on the plurality of skills, wherein Y-axis of the distribution indicates a probability of a certain word defining a skill among the plurality of skills and X-axis of the distribution indicates numbers of the keywords, wherein a color coding configuration on the graphical user interface enables the graphical representation to display different information for the plurality of skills;
extracting, by the at least one processor and from the abstract syntax tree, most frequently occurring structural elements for a plurality of variables within the at least one file, each of the structural elements corresponding to a programing language;
classifying, by the at least one processor, each of the at least one file based on at least the programming language corresponding to each of the structural elements of the abstract syntax tree;
determining, by the at least one processor using the at least one model, at least one proficiency attribute of the user with respect to a time point based on each of the code dependencies, the distribution of keywords, the frequency of occurrence of each of the structural elements and a result of the classification;
identifying, by the at least one processor, at least one characteristic of the user based on corresponding activity data from the at least one repository;
generating, by the at least one processor, a profile that corresponds to the user based on the at least one proficiency attribute and the at least one characteristic, the profile including a plurality of proficiency attributes that correspond to the user, wherein the profile is updated each time a new file becomes available in the at least one repository for providing an updated profile in real-time,
wherein identifying the at least one characteristic further comprises:
retrieving, by the at least one processor, the corresponding activity data for each of the at least one file from the at least one repository;
parsing, by the at least one processor, the corresponding activity data and removing excess data from the corresponding activity data;
determining, by the at least one processor, at least one metric by computing the parsed corresponding activity data without the removed excess data; and
identifying, by the at least one processor, the at least one characteristic by using the at least one metric; and
displaying, on the graphical user interface, the profile that corresponds to the user and the plurality of graphical elements that indicates the level of proficiency corresponding to each of the plurality of skill labels for the user.

2. The method of claim 1, further comprising:
determining, by the at least one processor, at least one retention strategy based on the profile and at least one predetermined guideline; and
identifying, by the at least one processor using the profile, at least one employment requisition, wherein at least one of the plurality of graphical elements includes information that relates to at least one from among the determined at least one retention strategy and the identified at least one employment requisition.

3. The method of claim 1, further comprising:
determining, by the at least one processor, at least one personalized training strategy for the user based on the profile; and
identifying, by the at least one processor, at least one training resource based on the determined at least one personalized training strategy,
wherein at least one of the plurality of graphical elements includes information that relates to at least one from among the determined at least one personalized training strategy and the identified at least one training resource.

4. The method of claim 1, wherein determining the at least one proficiency attribute further comprises:
- extracting, by the at least one processor, code data from the at least one file, the code data including at least one from among code dependency data, code documentation data, and code structure data;
- assigning, by the at least one processor, at least one feature to the code data, the at least one feature defining at least one from among an identified code dependency and an identified code functionality;
- generating, by the at least one processor, at least one structured data set based on the code data and the assigned at least one feature; and
- automatically determining, by the at least one processor using the at least one model, the at least one proficiency attribute based on the at least one structured data set.

5. The method of claim 1, wherein the at least one metric includes at least one from among a code volume metric, a code complexity metric, and a code interaction metric.

6. The method of claim 1, wherein the corresponding activity data includes information that relates to at least one from among commit information and review information, the information corresponding to at least one master branch for a predetermined period of time.

7. The method of claim 1, wherein the excess data includes at least one from among an integrated development environment generated code, a duplicate code, and a configuration code.

8. The method of claim 1, wherein the at least one code snippet relates to a small region of reusable code that corresponds to at least one from among a source code, a machine learning code, and a textual code.

9. The method of claim 1, wherein the at least one proficiency attribute includes at least one skill group, the at least one skill group including at least one from among a front-end developer skill group, a back-end developer skill group, a development and operations engineer skill group, and a data scientist skill group.

10. The method of claim 1, wherein the at least one model further includes at least one from among a statistical model, a mathematical model, a process model, and a data model.

11. A computing device configured to implement an execution of a method for automatically identifying proficiencies based on an associated set of codes, the computing device comprising:
- a processor,
- a memory; and
- a communication interface coupled to each of the processor and the memory,
- wherein the processor is configured to:
  - retrieve at least one file that is associated with a user from at least one repository, the at least one repository including a source code repository that is incomplete, and the at least one file includes at least one code snippet of a source code that is less than the source code;
  - vectorize, via execution of build tools, content of the at least one file for generating a plurality of vectors that is inputted into at least one model, the at least one model including a machine learning model,
  - wherein the content of the at least one file includes one or more code dependencies based on at least socket addresses, keywords, structural elements, an external code dependency, an internal code dependency, compile time dependency and runtime dependency, and
  - wherein the generating of the plurality of vectors includes combining the one or more of the code dependencies, the keywords, the structural elements, the external code dependency, the internal code dependency, the compile time dependency and the runtime dependency for generating the plurality of vectors;
  - generate an abstract syntax tree using the at least one file, wherein the abstract syntax tree is generated by identifying the structural elements within the at least one file via natural language processing and parsing the structural elements for classification;
  - analyze the structural elements based on the generated abstract syntax tree, wherein the abstract syntax tree represents an abstract syntactic structure of the source code, and wherein each node of the abstract syntax tree denotes a construct occurring in the source code;
  - identify, based on the analyzing using the generated abstract syntax tree, frequency of occurrence of each of the structural elements;
  - train the machine learning model using the plurality of vectors, the abstract syntax tree, and the frequency of occurrence of each of the structural elements with respect to a plurality of skill labels for a plurality of skills;
  - determine, via the machine learning model, a level of proficiency corresponding to each of the plurality of skill labels based on the vectorized content of the at least one file and the frequency of occurrence of each of the structural elements;
  - generate a plurality of graphical elements that indicates the level of proficiency corresponding to each of the plurality of skill labels for the user;
  - display, on a graphical user interface, a graphical representation of a distribution of the keywords included in the at least one file based on the plurality of skills, wherein Y-axis of the distribution indicates a probability of a certain word defining a skill among the plurality of skills and X-axis of the distribution indicates numbers of the keywords, wherein a color coding configuration on the graphical user interface enables the graphical representation to display different information for the plurality of skills;
  - extract, from the abstract syntax tree, most frequently occurring structural elements for a plurality of variables within the at least one file, each of the structural elements corresponding to a programing language;
  - classify each of the at least one file based on at least the programming language corresponding to each of the structural elements of the abstract syntax tree;
  - determine, by using the at least one model, at least one proficiency attribute of the user with respect to a time point based on each of the code dependencies, the distribution of keywords, the frequency of occurrence of each of the structural elements and a result of the classification;
  - identify at least one characteristic of the user based on corresponding activity data from the at least one repository;
  - generate a profile that corresponds to the user based on the at least one proficiency attribute and the at least one characteristic, the profile including a plurality of proficiency attributes that correspond to the user, wherein the profile is updated each time a new file becomes available in the at least one repository for providing an updated profile in real-time, wherein identifying the at least one characteristic further comprises:
retrieve the corresponding activity data for each of the at least one file from the at least one repository;
parse the corresponding activity data and remove excess data from the corresponding activity data;
determine at least one metric by computing the parsed corresponding activity data without the removed excess data; and
identify the at least one characteristic by using the at least one metric; and
display, on the graphical user interface, the profile that corresponds to the user and the plurality of graphical elements that indicates the level of proficiency corresponding to each of the plurality of skill labels for the user.

12. The computing device of claim 11, wherein the processor is further configured to:
determine at least one retention strategy based on the profile and at least one predetermined guideline; and
identify, by using the profile, at least one employment requisition,
wherein at least one of the plurality of graphical elements includes information that relates to at least one from among the determined at least one retention strategy and the identified at least one employment requisition.

13. The computing device of claim 11, wherein the processor is further configured to:
determine at least one personalized training strategy for the user based on the profile; and
identify at least one training resource based on the determined at least one personalized training strategy,
wherein at least one of the plurality of graphical elements includes information that relates to at least one from among the determined at least one personalized training strategy and the identified at least one training resource.

14. The computing device of claim 11, wherein, for determining the at least one proficiency attribute, the processor is further configured to:
extract code data from the at least one file, the code data including at least one from among code dependency data, code documentation data, and code structure data;
assign at least one feature to the code data, the at least one feature defining at least one from among an identified code dependency and an identified code functionality;
generate at least one structured data set based on the code data and the assigned at least one feature; and
automatically determine, by using the at least one model, the at least one proficiency attribute based on the at least one structured data set.

15. The computing device of claim 11, wherein the at least one metric includes at least one from among a code volume metric, a code complexity metric, and a code interaction metric.

16. The computing device of claim 11, wherein the corresponding activity data includes information that relates to at least one from among commit information and review information, the information corresponding to at least one master branch for a predetermined period of time.

17. The computing device of claim 11, wherein the excess data includes at least one from among an integrated development environment generated code, a duplicate code, and a configuration code.

18. The computing device of claim 11, wherein the at least one code snippet relates to a small region of reusable code that corresponds to at least one from among a source code, a machine learning code, and a textual code.

19. The computing device of claim 11, wherein the at least one proficiency attribute includes at least one skill group, the at least one skill group including at least one from among a front-end developer skill group, a back-end developer skill group, a development and operations engineer skill group, and a data scientist skill group.

20. The computing device of claim 11, wherein the at least one model further includes at least one from among a statistical model, a mathematical model, a process model, and a data model.

* * * * *